July 12, 1960    G. T. DENNIS    2,944,474
UNDERWATER CAMERA HOUSING WITH OPERATING MEANS
Filed May 14, 1959    2 Sheets-Sheet 1
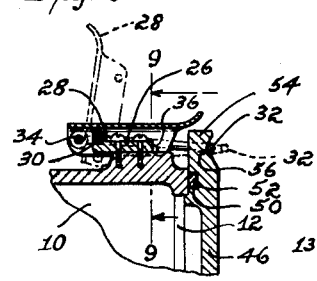
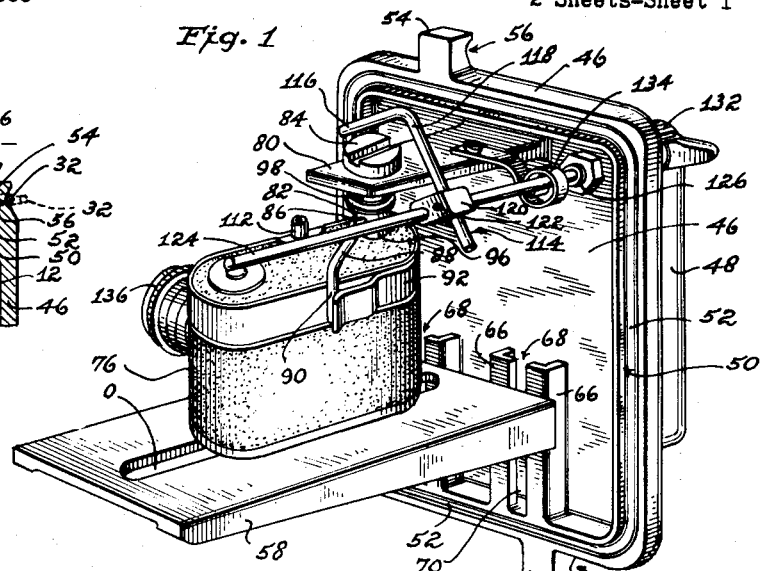
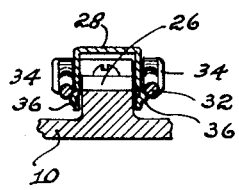
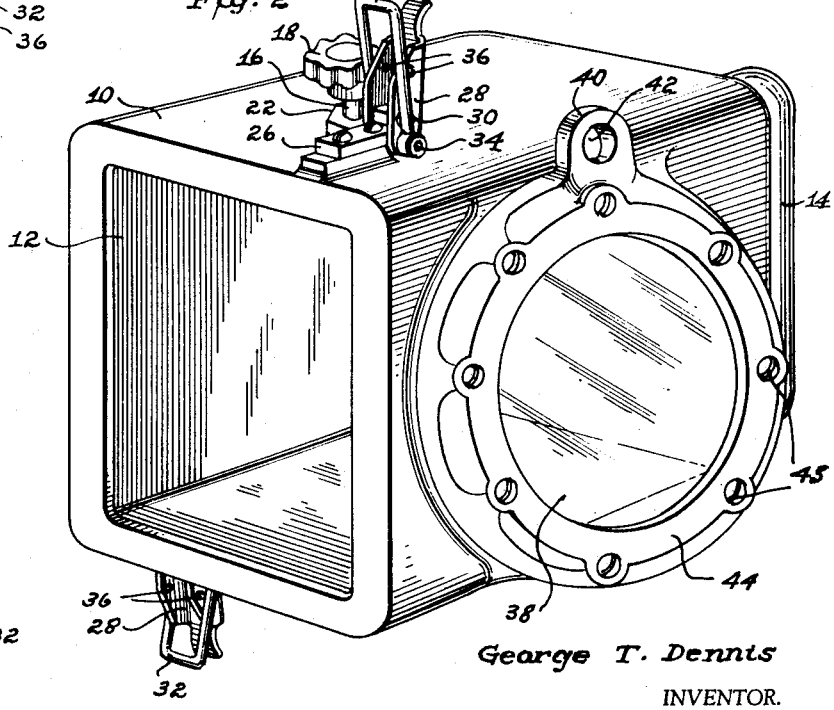
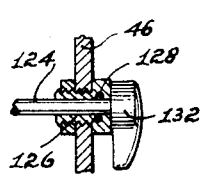
George T. Dennis
INVENTOR.
BY
ATTORNEY July 12, 1960 G. T. DENNIS 2,944,474
UNDERWATER CAMERA HOUSING WITH OPERATING MEANS
Filed May 14, 1959 2 Sheets-Sheet 2
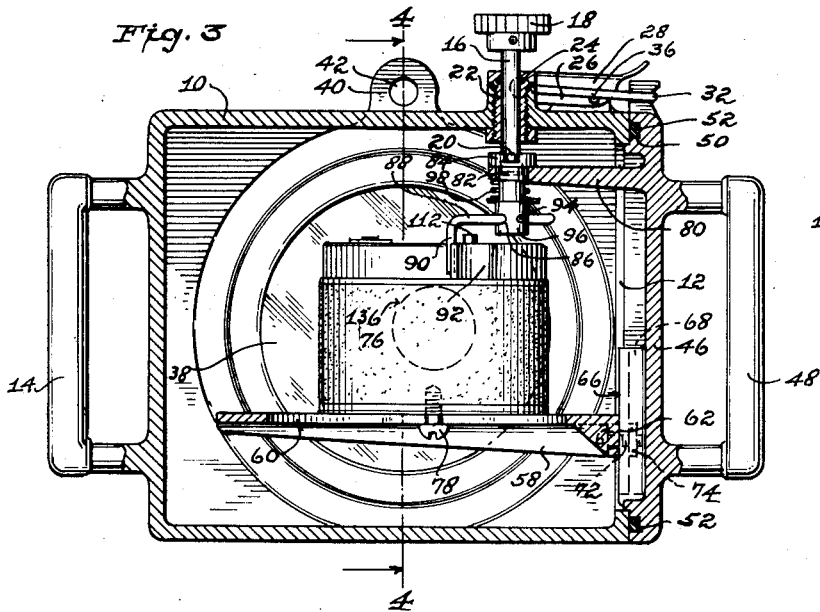
George T. Dennis
INVENTOR.
BY J. N. Mell
ATTORNEY

2,944,474

UNDERWATER CAMERA HOUSING WITH OPERATING MEANS

George T. Dennis, Trenton, N.J., assignor to Everett W. Edmund, Haddonfield, N.J.

Filed May 14, 1959, Ser. No. 813,119

3 Claims. (Cl. 95—11)

This invention relates to underwater camera housings, and one of the principal objects of the invention is to provide a housing of the character mentioned with means for adjusting it to accommodate cameras of various sizes as well as having numerous types and locations of film winding and shutter actuating elements and with means for operating such elements from outside the housing.

Another important object of the present invention is to provide an underwater camera housing in which all the operating parts, with the exception of the film winding shaft, are mounted on the closure plate for the open end of the housing.

My improved underwater camera has been found adaptable to well over one hundred models of 35 mm. cameras, rendering it practically universal for such cameras.

Other objects and advantages of the invention will appear or be pointed out in the following specification in which reference is had to the accompanying drawings, in which:

Fig. 1 is a perspective view of the closure plate for the open end of the housing with various operating parts mounted thereon;

Fig. 2 is a perspective view of the housing with a film winding shaft and latch means carried thereby;

Fig. 3 is a central section of the housing in side elevation, with a camera shown in side elevation;

Fig. 4 is a section taken on the line 4—4 of Fig. 3 with the camera shown in end elevation;

Fig. 5 is a partial section similar to Fig. 3, but showing a camera having a different type of film winding element and means for coupling it to the film winding shaft;

Fig. 6 is a detail view, partly in section, of the coupling means shown in Fig. 5;

Fig. 7 is a section taken on the line 7—7 of Fig. 4;

Fig. 8 is a detail sectional view of the latch means;

Fig. 9 is a detail section taken on the line 9—9 of Fig. 8; and

Fig. 10 is a detail sectional view showing the mounting of the shutter operating shaft.

Referring to the drawings in which like numerals designate like parts in the several views, 10 is a rectangular housing having an open end 12 and a handle 14 at its opposite end. A film winding shaft 16 having a handle 18 on its outer end and a cross-pin 20 at its inner end is journaled in a bushing 22 screwthreaded vertically through the top wall of the housing, an O-ring 24 in the bushing providing a fluid-tight packing for the shaft. Outwardly projecting lugs 26 are mounted on the top and bottom of the housing and latch levers 28 are pivotally mounted near their ends at the rear ends of the lugs, as indicated at 30. U-shaped loop members 32 are pivotally mounted at their free ends on the latch levers 28, as indicated at 34. The latch levers are provided on each side with hemispherical projections 36 for locking engagement with the side portions of the loop member, as will hereinafter be described. The housing has a transparent lens window 38 in one side. A projecting lug 40 having therein a sighting opening 42 is formed on the top edge of the resilient window frame 44 which is clamped to the housing by screws 45.

A closure plate 46 has a handle 48 corresponding to the handle 14 on the housing 10. In a continuous groove 50 in the inner marginal face of the plate 48 is inserted an O-ring 52 for engagement with the end of the wall defining the open end 12 of the housing 10 for sealing the closure plate to the housing in fluid-tight relation when clamped thereto, as will be described. Lugs 54 having outwardly facing grooves 56 are formed on the respective top and bottom edges of the closure plate in positions for alignment with the loop members 32 on the housing. As more clearly shown in Fig. 8, when the latch levers 28 are lifted on their pivots, at 30, as shown in broken lines, the loop members will be extended forwardly so that they can be placed over the lugs 54. Then, when the latch levers are forced downwardly the ends of the loop members will be tightly drawn against the bottoms of the grooves 56, the short leverage between the pivotal points 30 and 34 providing a powerful retractive force to the loop members and a consequent strong clamping action to the closure plate 14 against the end of the housing 10. In the downward movement of the latch levers sufficient pressure will be applied to force the hemispherical projections 36 past the side portions of the loop members 32 due to their resiliency, thus providing an effective lock against accidental lifting of the levers.

As shown in Figs. 1, 3, 4 and 5 the means for supporting a camera in the housing 10 includes a flat, elongated bracket 58 having therein a central longitudinal slot 60 and a depending flange 62 extending across one end and provided with slots 64 parallel with said flange. The inner face of the closure plate 48 has projecting vertical portions 66 having therein vertical, rectangular sockets 68 (Fig. 7) with vertical slots 70 facing the interior of the casing 10. The bracket 58 is installed with the flange 62 abutting the socket portions 66. Headed screws 72 project through the slots 64 and 70 into nuts 74 slidably mounted in the sockets 68. The bracket 58 may be fixedly clamped to the closure plate 48 in different horizontal positions and adjusted both vertically and laterally by means of the headed screws 72 and nuts 74. A camera 76 may be clamped to the bracket in various positions longitudinally of the bracket 58 by means of a headed screw 78 projecting through the slot 60 into screw-threaded engagement with the camera. Thus, the position of the camera in the housing may be adjusted vertically, laterally and longitudinally relative to the housing.

An arm 80 projecting from the inner face of the closure plate 48 has rotatably mounted therein a rotatable key member 82 in coaxial relation with the film winding shaft 16 when the closure plate is in clamped position on the housing 10. This key member has a slotted head 84 above the arm for coupling with the pin 20 on the shaft 16. The key member also has a transverse hole 86 in its lower portion below the arm. Through this hole is slidably mounted a finger 88 having a bent end portion 90 for engagement with the projecting end of a bandlike film winding element 92 mounted for rotary movement about the end of the camera 76. The finger is held in radially adjusted positions by a set screw 94. The key member may be reduced in diameter to form a headed end portion 96, and a spring 98 inserted between the arm 80 and the headed portion to hold it in its down position, during the film winding operation.

The type of camera 100 shown in Figs. 5 and 6 is generally similar to the camera 76 shown in Figs. 1, 3 and 4 but as a film winding element the film spool (not shown) has a central hollow stem 102 on which a cap (not shown) is mounted as a handle for rotating the spool. In the present invention a specially designed centrally bored cap 104 has been substituted for the conventional cap. The cap 104 has a slot 106 in its top and is loosely mounted on the rotatable film winding key member 82. A cross-pin 108 for coupling engagement with the slot 106 is inserted in the opening 86 of the key member in the place of the finger 88. Otherwise the housing 10 and the operating parts are the same as shown in Figs. 1, 2, 3 and 4. The cap 104 is secured in fixed relation on the stem 102 by set screws 110.

The shutter actuating element of both the cameras illustrated consists of a vertical plunger 112 the outer end of which projects above the top surface of the camera. The means for depressing this plunger consists of a finger 114 having a bent end portion 116 for engagement with the plunger and a straight portion 118 slidably and rotatably mounted in a fitting 120 and held in adjusted fixed relation therein by a set screw 122. The fitting 120 is in turn slidably and rotatably mounted on a horizontal shaft 124 projecting through a sleeve 126 screwthreadedly mounted in the wall of the closure plate 46, an O-ring 128 (Fig. 10) in the sleeve serving as a packing for sealing the shaft in fluid-tight relation with the plate. The fitting 120 is held in adjusted fixed relation with the shaft 124 by a set screw 130 (Fig. 4). The shaft 124 preferably lies in a plane above the top of the camera 76—100 and has a handle 132 on its outer end for rotating it. This shaft when rotated and released is automatically returned to its normal starting position by means of a torsion spring 134 attached to the shaft and to the arm 80.

The lens window is of substantially greater diameter than that of the lens 136 of the camera 76—100 to permit necessary adjustment of position of cameras of various dimensions in the housing without bringing the lens outside the area of the window.

From the foregoing description it will be seen that I have provided an underwater camera housing with means for supporting certain types of cameras in various universally adjusted positions in the housing and with adjustable means for operating the film winding and shutter actuating elements of cameras of various makes and dimensions from outside the casing, also that all the operating parts, except the film winding shaft, are mounted on the closure plate, which enables the operator to make all the necessary adjustments before the closure plate is clamped to the housing. I have also provided convenient clamping means for the housing and closure plate by means of which leakage into the housing, even at great depths in water, is positively precluded.

Obviously various changes or modifications may be made in my improved underwater camera housing within the spirit and scope of my invention. Therefore it should be understood that the embodiments of my invention shown and described are intended to be illustrative only and restricted only by the appended claims.

I claim:

1. In combination with a camera having a laterally focused lens, an exposed horizontally rotatable film winding element and a vertically projecting shutter actuating plunger, a rectangular housing for said camera open at one end and having a transparent lens window of substantially greater area than that of said lens, a film winding shaft projecting vertically through the top wall of said housing in fluid-tight relation therewith, said shaft having a handle on its outer end and coupling means on its inner end, a closure plate for said housing having a sealing ring in its marginal inner face for sealing engagement with the open end of said housing, coengaging means on said plate and housing for clamping said plate to said housing in fluid-tight relation, a camera support, means engageable with said support and said closure plate for clamping said support to said plate in different vertically and laterally relative positions, means engageable with said support and said camera for clamping said camera to said support in different relative positions, a vertically rotatable key member carried by said closure plate in position for coaxial relation with said winding shaft, said member having means on its lower end for engagement with and rotating said film winding element and coupling means on its upper end for coengagement with the coupling means on said film winding shaft, a shutter operating shaft projecting through said closure plate in fluid-tight relation therewith, said shaft having a handle on its outer end and means inside said housing engageable with the exposed end of said shutter actuating plunger for depressing said plunger upon rotation of said shaft.

2. In combination with a camera having a laterally focused lens, an exposed horizontally rotatable film winding element and a vertically projecting shutter actuating plunger, a rectangular housing for said camera open at one end and having a transparent lens window of substantially greater area than that of said lens, a closure plate for said housing having a sealing ring in its marginal inner face for sealing engagement with the open end of said housing, coengaging means on said plate and housing for clamping said plate to said housing in fluid-tight relation, an elongated camera supporting bracket mounted on the inner face of said plate perpendicular thereto, said bracket having a longitudinal slot therein, screw threaded means projecting through said slot in engagement with said bracket and camera for clamping said camera to said bracket in different longitudinally relative positions, means engageable with said closure plate and the end of the camera supporting bracket adjacent thereto for clamping said bracket to said plate in different vertically and laterally relative positions, an arm projecting inwardly from said closure plate above and in parallel relation with said camera supporting bracket, a key member vertically and rotatably mounted in the outer end of said arm, said member having means below said arm for engagement with and rotating said film winding element and coupling means above said arm for engagement with a film winding shaft, a film winding shaft projecting through the top wall of said housing in fluid-tight relation therewith and in coaxial relation with said key member, said shaft having a handle on its outer end and coupling means on its inner end for coengagement with the coupling means on said key member, a shutter operating shaft projecting through said closure plate in fluid-tight relation therewith in a plane above that of the top of the camera, said shaft having a handle on its outer end and means inside said housing engageable with the exposed end of said shutter actuating plunger for depressing said plunger upon rotation of said shaft.

3. In combination with a camera having a lens, an exposed winding element and a shutter actuating element, a rectangular housing for said camera open at one end and having a transverse lens window of substantially greater area than that of said lens, a film winding shaft projecting through one wall of said housing in fluid-tight relation therewith, said shaft having a handle on its outer end and coupling means on its inner end, a closure plate for said housing having a sealing ring in its marginal inner face for sealing engagement with the open end of said housing, coengaging means on said plate and housing for clamping said plate to said housing in fluid-tight relation, means carried by said closure plate for supporting said camera in different positions in said housing including an elongated bracket having therein a longitudinal slot, screwthreaded means projecting through said slot for engagement with said bracket and camera, a transverse flange at one end of said bracket having slots therein, vertical slots in said closure plate registrable with said transverse slots and screwthreaded means projecting through said slots engageable with said bracket and closure plate for clamping said bracket to said plate, the vertical slots in the closure plate being in the form of a pair of parallel, rectangular sockets having vertical slots facing the end of the camera supporting bracket, the said screwthreaded means comprising headed screws projecting through the transverse slots in said bracket and the vertical slots in said closure plate, and nuts for said screws slidably mounted in said sockets, means carried by said closure plate engageable with said film winding shaft and said film winding element for operating said element, and a shutter operating shaft projecting through said closure plate in fluid-tight relation therewith, said shaft having a handle on its outer end and means inside said housing engageable with said shutter actuating element for operating said element.

References Cited in the file of this patent

UNITED STATES PATENTS

| | | |
|---|---|---|
| 2,487,868 | Grigsley | Nov. 15, 1949 |
| 2,573,885 | Whitman | Nov. 6, 1951 |
| 2,865,271 | Klein | Dec. 23, 1958 |
| 2,883,919 | Jayet | Apr. 28, 1959 |

FOREIGN PATENTS

| | | |
|---|---|---|
| 744,934 | France | Jan. 31, 1933 |